United States Patent
Lin et al.

(10) Patent No.: US 11,967,273 B2
(45) Date of Patent: Apr. 23, 2024

(54) LIGHT EMITTING DIODE (LED) DRIVE CIRCUIT PROVIDING OVER-VOLTAGE PROTECTION OF OUTPUT VOLTAGE FEEDBACK TERMINALS

(71) Applicants: MIANYANG HKC OPTOELECTRONICS TECHNOLOGY CO., LTD., Sichuan (CN); HKC CORPORATION LIMITED, Shenzhen (CN)

(72) Inventors: Peiyang Lin, Sichuan (CN); Honghai Liu, Sichuan (CN); Xiaowei Han, Sichuan (CN); Rongrong Li, Sichuan (CN)

(73) Assignees: MIANYANG HKC OPTOELECTRONICS TECHNOLOGY CO., LTD., Sichuan (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/145,965

(22) Filed: Dec. 23, 2022

(65) Prior Publication Data
US 2023/0351949 A1    Nov. 2, 2023

(30) Foreign Application Priority Data
Apr. 27, 2022   (CN) .......................... 202210450103.2

(51) Int. Cl.
*G09G 3/32*    (2016.01)

(52) U.S. Cl.
CPC ....... *G09G 3/32* (2013.01); *G09G 2300/0819* (2013.01); *G09G 2310/0291* (2013.01); *G09G 2330/021* (2013.01)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

2008/0054815 A1*  3/2008  Kotikalapoodi ....... H05B 45/38
                                                                 315/192
2008/0093997 A1   4/2008  Chen et al.
(Continued)

FOREIGN PATENT DOCUMENTS

CN    106710531 A    5/2017
CN    110085176 A    8/2019
(Continued)

*Primary Examiner* — Ke Xiao
*Assistant Examiner* — Nelson Lam
(74) *Attorney, Agent, or Firm* — Maier & Maier, PLLC

(57) ABSTRACT

A control circuit, a drive device, and a display. The control circuit includes: a control unit and a detection unit. The detection unit is connected with a plurality of output voltage feedback terminals of a drive chip, and the detection unit is connected with the control unit. The detection unit is configured for providing a first voltage to the control unit when a voltage of at least one output voltage feedback terminal in the plurality of output voltage feedback terminals is detected, the first voltage being greater than a second voltage received by the control unit. The control unit is configured for controlling the drive chip to restart when the first voltage is greater than the second voltage.

18 Claims, 7 Drawing Sheets

(58) Field of Classification Search
CPC .... G09G 3/3233; G09G 3/3241; G09G 3/325; G09G 3/3258; G09G 3/3266; G09G 3/3275; G09G 3/3283; G09G 3/3291; G09G 3/342; G09G 2300/0819; G09G 2310/0291
USPC .................................................. 345/76–83
See application file for complete search history.

(56) References Cited

U.S. PATENT DOCUMENTS

| | | | |
|---|---|---|---|
| 2008/0170012 A1* | 7/2008 | S .......................... | G09G 3/3413 345/82 |
| 2008/0290906 A1* | 11/2008 | Chou ................. | H05B 45/3725 327/77 |
| 2009/0128045 A1* | 5/2009 | Szczeszynski ....... | H05B 45/347 315/185 R |
| 2010/0102746 A1* | 4/2010 | Edwards ................ | H05B 45/14 315/291 |
| 2013/0099684 A1* | 4/2013 | Cheng .................. | H05B 45/375 315/186 |
| 2015/0319820 A1* | 11/2015 | Puvanakijakorn ..... | H05B 45/50 315/307 |
| 2018/0014370 A1* | 1/2018 | Wang ...................... | G05F 1/461 |
| 2020/0152121 A1* | 5/2020 | Sung .................... | G09G 3/3275 |
| 2021/0142728 A1* | 5/2021 | Jiang .................... | G09G 3/3291 |

FOREIGN PATENT DOCUMENTS

| | | |
|---|---|---|
| CN | 110910810 A | 3/2020 |
| CN | 113206536 A | 8/2021 |
| CN | 113258538 A | 8/2021 |

* cited by examiner

LIGHT EMITTING DIODE (LED) DRIVE CIRCUIT PROVIDING OVER-VOLTAGE PROTECTION OF OUTPUT VOLTAGE FEEDBACK TERMINALS

CROSS REFERENCE TO RELATED APPLICATION

Pursuant to 35 U.S.C. § 119 and the Paris Convention Treaty, this application claims the benefit of Chinese Patent Application No. 202210450103.2 filed Apr. 27, 2022, the contents of which are incorporated herein by reference.

TECHNICAL FIELD

The present application relates to the field of drive chips, and more particularly to a control circuit, a drive device, and a display.

BACKGROUND

When light emitting diode (LED) is used as a display, on the one hand, in order to avoid drive current exceeding the maximum rating and affecting the reliability of the display, on the other hand, in order to obtain the expected brightness requirements and ensure the consistency of brightness and chroma of each LED, it is necessary to conduct constant current drive, that is, the LED drive chip is needed to be used in the LED display.

In the prior art, the LED drive circuit is shown in FIG. 1. The LED drive chip has the over-voltage protection function of the output voltage feedback terminals. Since the radio frequency RF test of the drive chip is difficult, each output voltage feedback terminal is added with a capacitor, but adding a high-capacity capacitor will lead to confusion of the internal protection mechanism of the chip. During the rapid change of pulse width modulation duty cycle, the output voltage feedback terminals will be protected randomly, which will cause that one or more backlight strings are not light up, and the abnormality of backlight strings will affect the effect of the LED display.

SUMMARY

The present application provides a control circuit, a drive device, and a display, which is used for the object of re-lighting the backlight strings connected to the output voltage feedback terminals provided with over-voltage protection.

The technical solution as following:

In a first aspect, a control circuit is provided, which includes: a control unit and a detection unit; the detection unit is connected with a plurality of output voltage feedback terminals of a drive chip, and the detection unit is connected with the control unit;

the detection unit is configured for providing a first voltage to the control unit when a voltage of at least one output voltage feedback terminal in the plurality of output voltage feedback terminals is detected, the first voltage being greater than a second voltage received by the control unit; and the control unit is configured for controlling the drive chip to restart when the first voltage is greater than the second voltage.

In the embodiment, since the load (such as backlight strings) connected to the output voltage feedback terminals will not lit when over-voltage protection occurs at the output voltage feedback terminals. In order to achieve the object of re-lighting the backlight strings connected to the output voltage feedback terminals where the over-voltage protection occurs, the technical solution of the present application detects the voltage at the output voltage feedback terminals, such that when any one of the output voltage feedback terminals occurs over-voltage protection (that is, a voltage is generated at the output voltage feedback terminals), the detection unit adjusts the first voltage outputted to the control unit, and the first voltage is greater than the second voltage. Since the control unit will control the drive chip to restart when the first voltage is greater than the second voltage, and after the drive chip restarts, each of the output voltage feedback terminals of the drive chip is not under over-voltage protection, so that the object of re-lighting the backlight strings connected to the output voltage feedback terminals where the over-voltage protection is achieved. Furthermore, the detection unit is further configured to provide a third voltage to the control unit when no voltage is detected at the plurality of output voltage feedback terminals, the third voltage is less than or equal to the second voltage received by the control unit; and the control unit is configured to control the drive chip in an operating state when the third voltage is less than or equal to the second voltage.

In an embodiment, the control circuit includes a voltage regulating unit; and the voltage regulating unit includes: a first resistor and a second resistor; a first terminal of the first resistor being connected to an external power supply, a second terminal of the second resistor being grounded, and a second terminal of the first resistor and the first terminal of the second resistor being connected for providing with the second voltage.

In an embodiment, the control circuit further includes a voltage stabilizing unit configured for providing operating voltage for the detection unit and the control unit, and the voltage stabilizing unit includes: a voltage stabilizer, a third resistor, and a capacitor; and a first input terminal of the voltage stabilizer is connected to a first terminal of the third resistor, and a second terminal of the third resistor is configured for receiving the second voltage; a first terminal of the capacitor is connected to the first input terminal of the voltage stabilizer, and a second terminal of the capacitor is grounded; and a second input terminal of the voltage stabilizer is connected to a first preset terminal.

In an embodiment, the detection unit includes a first operational amplifier; and a non-inverting input terminal of the first operational amplifier is connected with the plurality of output voltage feedback terminals, an inverting input terminal of the first operational amplifier is grounded, and an output terminal of the first operational amplifier is connected to a first input terminal of the control unit.

In an embodiment, the detection unit further includes: a fourth resistor and a fifth resistor; and a first terminal of the fourth resistor is connected to the inverting input terminal of the first operational amplifier, and a second terminal of the fourth resistor is grounded; and a first terminal of the fifth resistor is connected to the inverting input terminal of the first operational amplifier, and a second terminal of the fifth resistor is connected to the output terminal of the first operational amplifier.

In an embodiment, the control unit includes: a second operational amplifier and a switching device; and a non-inverting input terminal of the second operational amplifier is connected with an output terminal of the detection unit for receiving the first voltage, and an inverting input terminal of the second operational amplifier is configured for receiving the second voltage; and an output terminal of the second operational amplifier is connected to a control terminal of the switching device, a first terminal of the switching device is connected to a second preset terminal, a second terminal of the switching device is grounded, the first terminal of the switching device is connected to an enable terminal of the drive chip, and the second preset terminal is configured for providing a voltage for the switching device.

In an embodiment, the control circuit further includes: a sixth resistor and a seventh resistor; and a first terminal of the sixth resistor is connected to the output terminal of the second operational amplifier, and a second terminal of the sixth resistor is grounded; and a first terminal of the seventh resistor is connected to a third preset terminal, and a second terminal of the seventh resistor is connected to the first terminal of the switching device.

In a second aspect, a drive device is provided, and the drive device includes the control circuit mentioned above.

In a third aspect, a display is provided, and the display includes: a plurality of backlight strings and a LED drive chip; each of the backlight strings is connected with one of the output voltage feedback terminals of the LED drive chip, and the LED drive chip is provided with the control circuit mentioned above.

It is understood that the beneficial effects of the second and third aspects above can be seen in the relevant description of the first aspect above, and will not be repeated here.

BRIEF DESCRIPTION OF THE DRAWINGS

In order to more clearly describe the technical solution in the embodiments of the present application, the following will briefly introduce the drawings needed to be used in the description of the embodiments. Obviously, the drawings in the following description are only some embodiments of the present application. For ordinary technicians in the art, other drawings can be obtained from these drawings without paying creative labor.

DETAILED DESCRIPTION OF THE EMBODIMENTS

In order to make the purpose, technical solution and advantages of the application clearer, the implementation mode of the present application will be further described in detail in combination with the drawings.

It should be understood that the "plurality of" mentioned in the present application refers to two or more. In the description of the present application, unless otherwise specified, "/" means "or", for example, A/B means A or B; the "and/or" in the present application is just a kind of association relationship that describes the association objects. It means that there can be three kinds of relationships, for example, A and/or B, which can mean that there are three cases: A, A and B, and B. In addition, in order to clearly describe the technical solution of the present application, words such as "first" and "second" are configured to distinguish the same or similar items with basically the same functions and functions. Those skilled in the art can understand that the words "first", "second" and the like do not limit the quantity and execution order, and the words "first", "second" and the like are not necessarily different.

Before the detailed explanation of the embodiments of the present application, the application scenario of the embodiments of the present application is described.

Taking the LED drive chip TPS61185 as an example, which has high conversion efficiency, however, it is difficult to test in the radio frequency test of electromagnetic compatibility. Therefore, a 0.1 uF capacitor is added to each output voltage feedback channel on the chip to solve this problem. However, the increase of high-capacity capacitance in the output voltage feedback channel will lead to the confusion of the internal protection mechanism of the chip. During the rapid change of the PWM duty cycle, one or more backlight strings will not light up randomly. While the TPS61185 chip will restart only when the output voltage feedback terminals are all protected. If there are a plurality of output voltage feedback terminals, the probability of all of the plurality of output voltage feedback terminals being protected is low, so that the chip is not able to be restarted.

The embodiments of the application provide a control circuit, a drive device and a display, which are explained in detail below.

Figure 1:
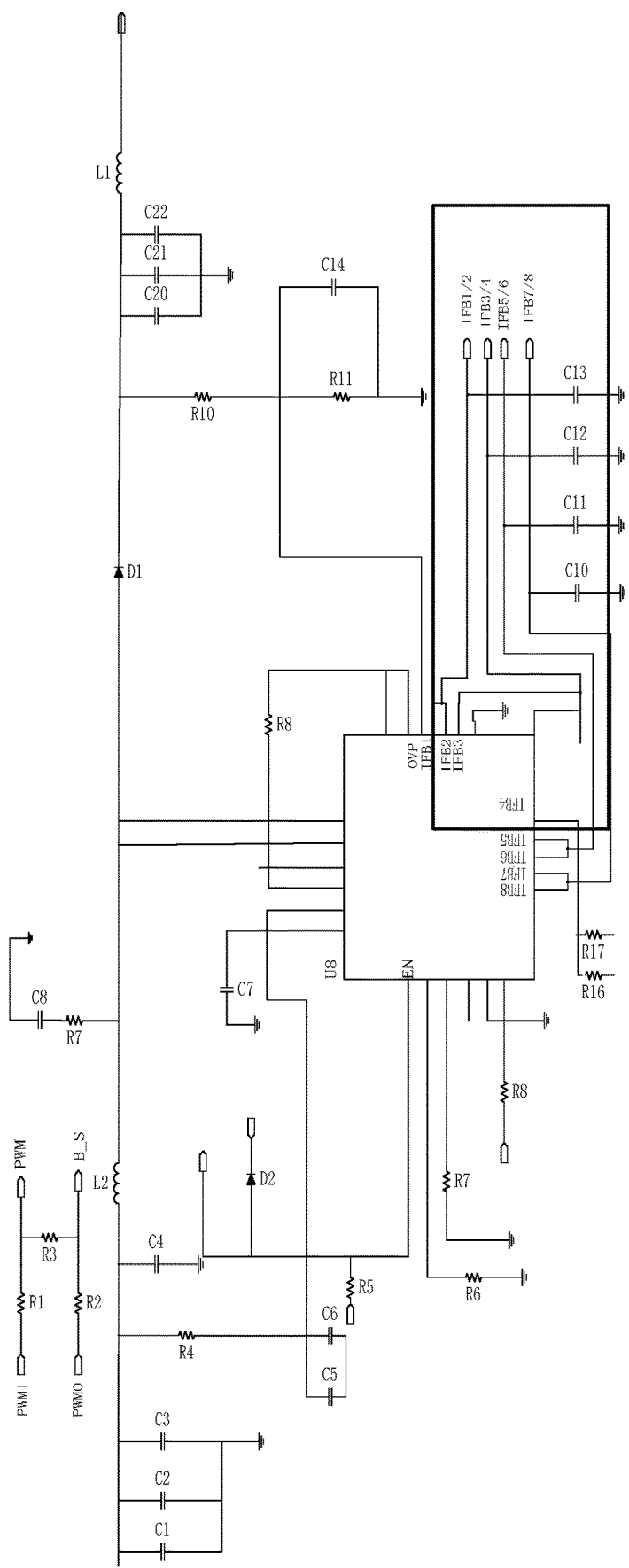
FIG. 1 is a circuit structural diagram of an LED drive circuit provided by an embodiment of the present application.
Figure 2:
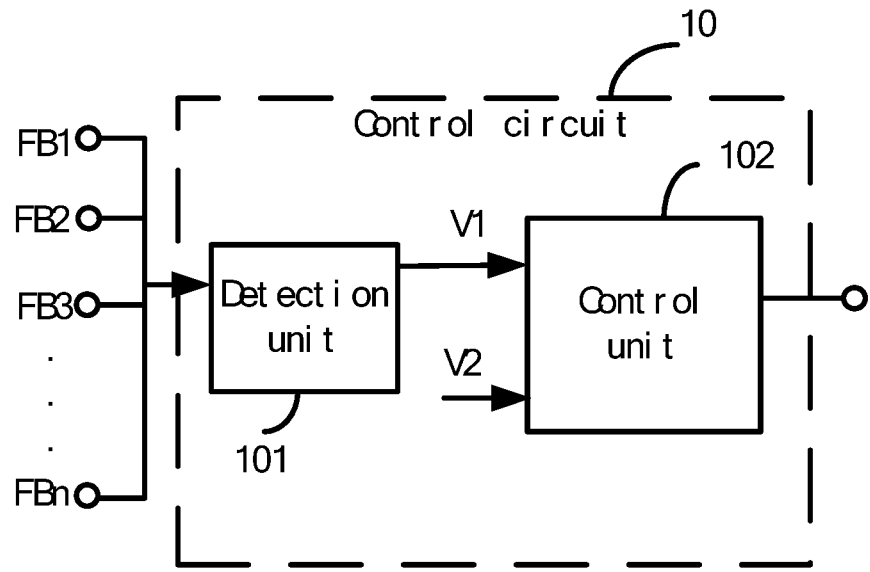
FIG. 2 is a structural diagram of a control circuit provided by an embodiment of the present application.

FIG. 2 provides a control circuit 10, which includes: a detection unit 101 and a control unit 102. The detection unit 101 is connected with a plurality of output voltage feedback terminals of a drive chip. The detection unit 101 is configured to provide a first voltage V1 to the control unit 102 when a voltage of at least one output voltage feedback terminal in the plurality of output voltage feedback terminals is detected, the first voltage V1 is greater than a second voltage V2 received by the control unit 102. The control unit 102 is configured to control the drive chip to restart when the first voltage V1 is greater than the second voltage V2.

The plurality of output voltage feedback terminals are connected to the input terminal of the detection unit 101 in parallel. The control unit 102 is provided with a first input terminal and a second input terminal, the first input terminal is configured to receive the first voltage V1, and the second input terminal is configured to receive the second voltage V2. As an example, after over-voltage protection occurs at one of the plurality of output voltage feedback terminals, the input terminal of the detection unit 101 detects a voltage rise, which increases the voltage at the output terminal of the detection unit 101. For example, the first voltage V1 at the first input terminal of the control unit 102 is greater than the second voltage V2, that is, the voltage at the second input terminal of the control unit 102. In this case, the control unit 102 controls the drive chip to restart.

As another example, after over-voltage protection occurs at any one of the output voltage feedback terminals of the multiple output voltage feedback terminals, the input terminal of the detection unit 101 detects the voltage rise and feeds the voltage rise back to the second input terminal of the control unit 102, so that the voltage at the second input terminal of the control unit 102 is decreased, that is, the second voltage V2 is decreased. At this time, the voltage (that is, the first voltage V1) at the first input terminal of the control unit 102 controls the drive chip to restart, the first voltage V1 is greater than the voltage (that is, the second voltage V2) of the second input terminal.

Since the load (such as backlight strings) connected to the output voltage feedback terminals are not light up when over-voltage protection occurs at the output voltage feedback terminals. Therefore, in order to achieve the object of re-lighting the backlight strings connected to the output voltage feedback terminals where the over-voltage protection occurs, the technical solution of the present application detects the voltage at the output voltage feedback terminals, such that when any one of the output voltage feedback terminals occurs over-voltage protection (that is, a voltage is generated at the output voltage feedback terminals), the detection unit adjusts the first voltage outputted to the control unit, and the first voltage is greater than the second voltage. Since the control unit will control the drive chip to restart when the first voltage is greater than the second voltage, and after the drive chip restarts, each of the output voltage feedback terminals of the drive chip is not under over-voltage protection, so that the object of re-lighting the backlight strings connected to the output voltage feedback terminals where the over-voltage protection is achieved.

In one embodiment of the present application, after over-voltage protection occurs at one of the plurality of output voltage feedback terminals, the detection unit 101 is specifically configured to increase the voltage value provided to the first input terminal from the initial voltage value to the first voltage V1, where the initial voltage value is less than the second voltage V2 of the second input terminal. For example, the initial voltage value is the following third voltage.

In one embodiment of the present application, when there is no voltage at the plurality of output voltage feedback terminals, the detection unit 101 adjusts the voltage values received by any one of the first input terminal and the second input terminal of the control unit 102, that is, the first voltage V1 and the second voltage V2, so that the third voltage at the first input terminal is less than or equal to the second voltage V2 at the second input terminal. The control unit controls the drive chip in an operating state when the third voltage of the first input terminal is less than or equal to the second voltage V2 of the second input terminal.

When the plurality of output voltage feedback terminals are without over-voltage protection, the backlight strings connected to each output voltage feedback terminal operates normally. At this time, the output terminal of the detection unit 101 does not change, and the second voltage V2 of the second input terminal of the control unit 102 is less than or equal to the third voltage of the first input terminal. At this time, the control unit 102 controls the drive chip to operate normally.

In one embodiment of the present application, when all output voltage feedback terminals in the plurality of output voltage feedback terminals do not have over-voltage protection, the detection unit 101 is specifically configured to maintain the voltage value provided to the first input terminal to be less than or equal to the voltage value of the second input terminal, such as the third voltage.

In an embodiment, when the first voltage V1 at the first input terminal of the control unit 102 is greater than the second voltage V2 at the second input terminal, the control unit 102 is configured to output the first level signal to the enable terminal of the drive chip. The first level signal is configured to restart the drive chip. For example, the first level signal is a high level signal.

In an embodiment, the control unit 102 is further configured to output the first instruction information to the drive chip. The first instruction information is configured to instruct the drive chip to restart immediately or restart after a preset time (for example, seconds), which is not limited in the embodiment of the present application. If it is an indication of immediate restart, the drive chip restarts immediately. If it is an indication of restart after a preset time, the drive chip restarts after a preset time.

In an embodiment, when the voltage at the first input terminal of the control unit 102 is less than or equal to the voltage at the second input terminal, the control unit 102 is configured to output the second level signal to the enable terminal of the drive chip. The first level signal is configured to operate the drive chip, that is, the drive chip is triggered to be in the operating state. For example, the first level signal is a low level signal, and the first level signal is different from the second level signal.

Figure 3:
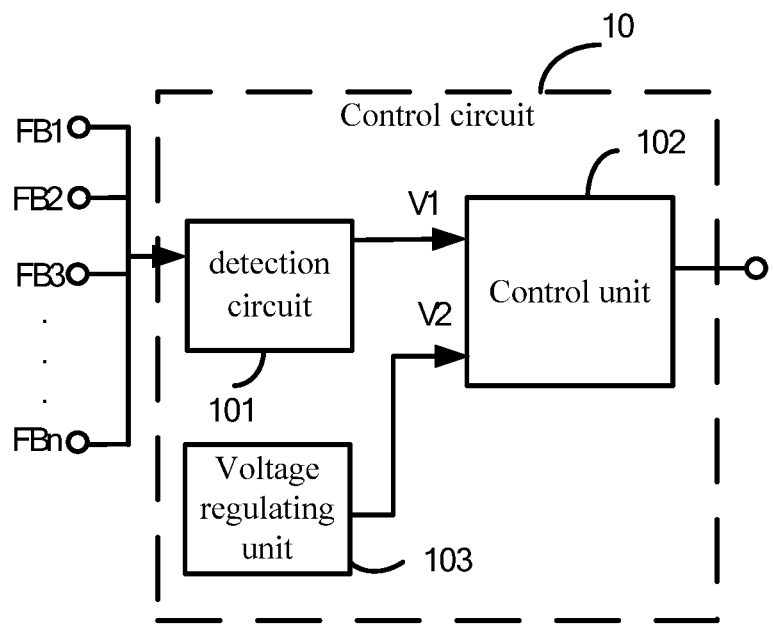
FIG. 3 is a structural diagram of a control circuit with a voltage regulating unit provided by an embodiment of the present application.

In the first embodiment, as shown in FIG. 3, the control circuit further includes a voltage regulating unit 103, which is configured to provide the second voltage V2 to the second input terminal of the control unit 102. In an embodiment, the second voltage V2 provided by the voltage regulating unit 103 for the second input terminal of the control unit 102 is a constant value. Alternatively, the second input terminal of the control unit 102 is connected to a fixed power supply.

In an embodiment, the second voltage V2 provided by the voltage regulating unit 103 for the second input of the control unit 102 is variable. It can be understood that when the second voltage V2 provided by the voltage regulating unit 103 for the second input terminal of the control unit 102 is variable, the drive chip can be restarted or in operating state by changing the amount of the second voltage V2 provided by the voltage regulating unit 103 for the second input of the control unit 102. For example, if the drive chip needs to be restarted, the second voltage V2 provided by the voltage regulating unit 103 for the second input terminal of the control unit 102 can be reduced so that the reduced second voltage V2 is less than the first voltage V1 provided by the detection unit 101 for the first terminal of the control unit 102.

Figure 4:
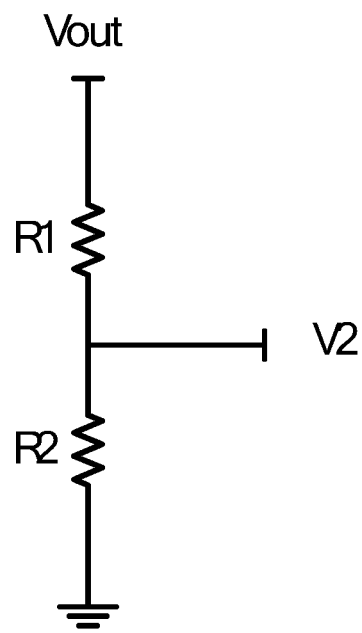
FIG. 4 is a circuit structural diagram of a voltage regulating unit provided by an embodiment of the present application.

For example, as shown in FIG. 4, the voltage regulating unit 103 includes: a first resistor R1 and a second resistor R2, the first terminal of the first resistor R1 is connected to an external power supply, the second terminal of the first resistor R1 is connected to the first terminal of the second resistor R2, and the second terminal of the second resistor R2 is grounded. The second terminal of the first resistor is connected with the first terminal of the second resistor to provide the second voltage V2 to the control unit 102.

The external power supply is configured to power on the drive chip, the first resistor R1 and the second resistor R2 are used for voltage division, so that the voltage of the power supply voltage division is the second voltage V2.

As an example, the resistance values of the first resistor R1 and the second resistor R2 are constant. When the external power supply starts to supply power, the second voltage V2 output by the voltage regulating unit 103 is constant.

As another example, at least one of the first resistor R1 and the second resistor R2 is an adjustable resistor (such as a sliding rheostat). When the detection unit 101 detects that over-voltage protection occurs at the output voltage feedback terminals, the detection unit 101 feedback the adjustment signal to the control unit 102, which is connected with the sliding control terminal of at least one of the first resistor R1 and the second resistor R2, the control unit 102 receives the adjustment signal to change the resistance value of at least one resistor by controlling the sliding control terminal, so that the second voltage V2 outputting from the voltage adjustment unit 103 to the control unit is reduced to the first voltage V1 less than that provided by the detection unit 101 for the control unit 102, so that the control unit 102 realizes that the voltage at the first input terminal of the control unit 102 is greater than the voltage at the second input terminal, to trigger the control unit 102 to control the drive chip to restart.

Figure 5:
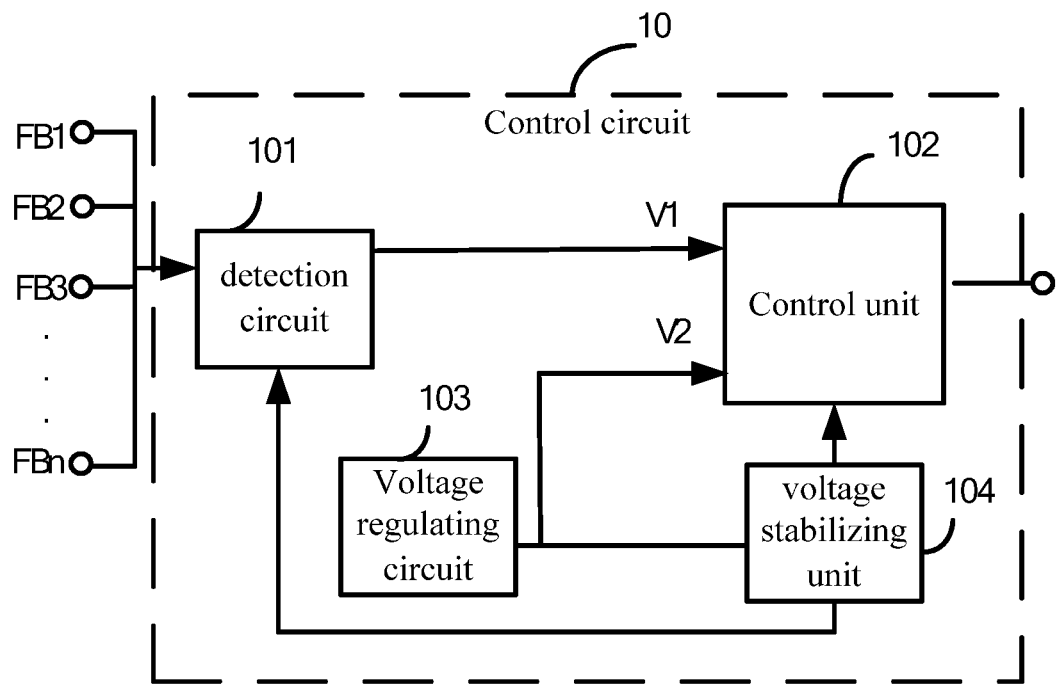
FIG. 5 is a structural diagram of a control circuit with a voltage stabilizing unit provided by an embodiment of the present application.

In the second embodiment, as shown in FIG. 5, the control circuit further includes a voltage stabilizing unit 104, which is configured to provide the operating voltages of the detection unit 101 and the control unit 102.

Figure 6:
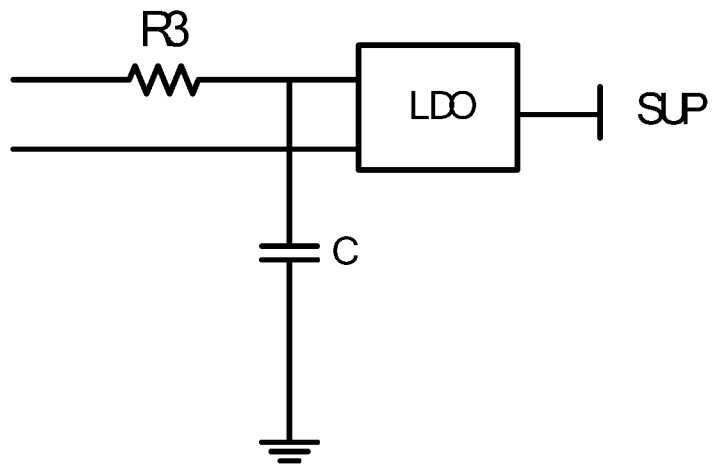
FIG. 6 is a circuit structural diagram of a voltage stabilizing unit provided by an embodiment of the present application.
Figure 9:
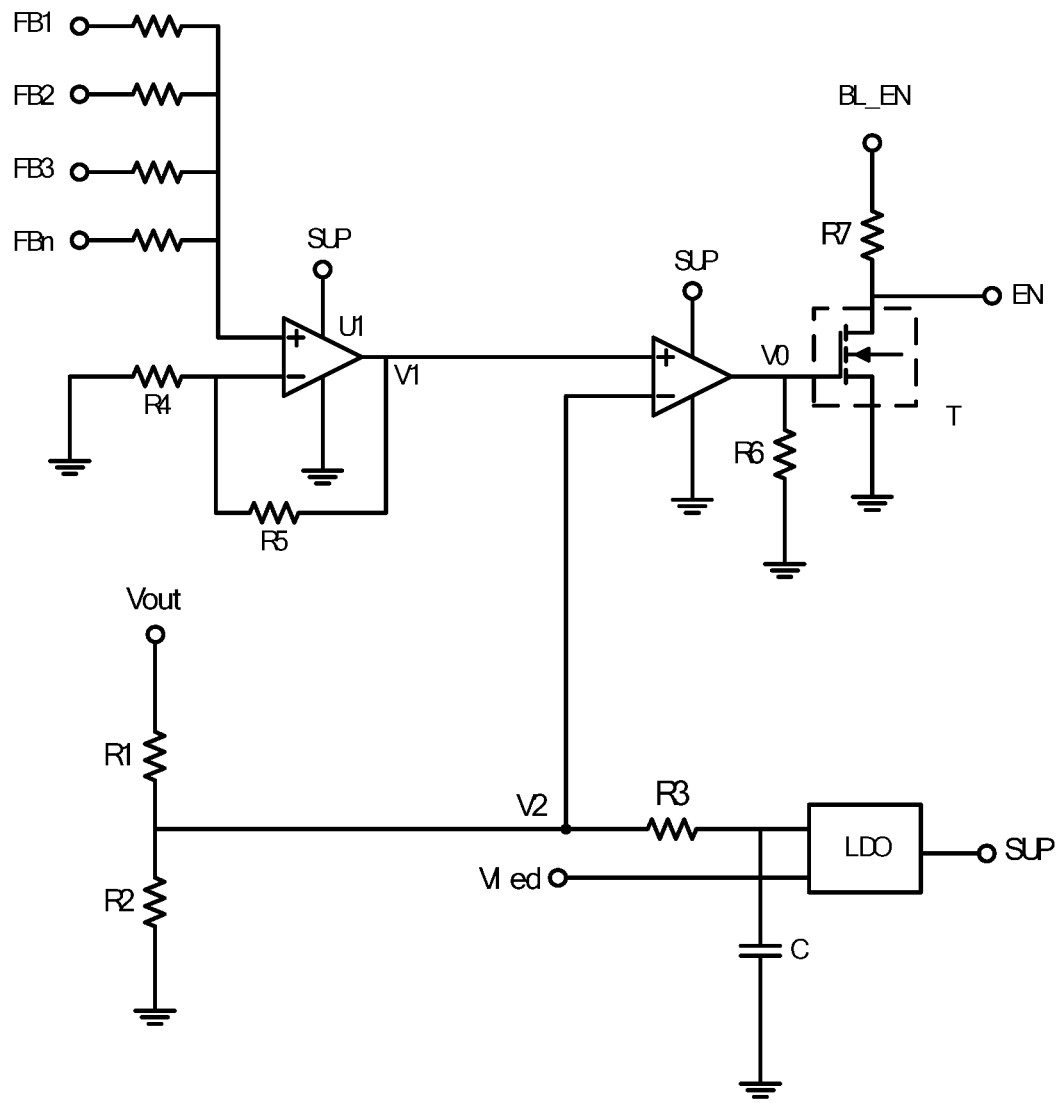
FIG. 9 is a circuit structural diagram of a control circuit provided by an embodiment of the present application.

As shown in FIG. 6 and FIG. 9, the voltage stabilizing unit 104 includes a voltage stabilizer LDO, a third resistor R3 and a capacitor C. The first input terminal of the voltage stabilizer LDO is connected to the first terminal of the third resistor R3, and the second terminal of the third resistor R3 is connected to the second terminal of the first resistor R1. The first terminal of capacitor C is connected to the first input terminal of voltage stabilizer LDO, and the second terminal of capacitor C is grounded. The second input terminal of the voltage regulator LDO is connected with the first preset terminal.

In the above first embodiment, the external power supply supplies power to the drive chip, and the first resistor R1 and the second resistor R2 connected in series to output the second voltage V2. The second voltage V2 is transmitted to the first input terminal of the voltage regulator LDO, the third resistor R3 is used for current limiting protection, and capacitor C is used for filtering. The first preset terminal is configured to receive and provide the voltage Vled, the voltage regulator LDO outputs the voltage SUP, and the voltage SUP is configured to start the detection unit 101 and the control unit 102.

Figure 7:
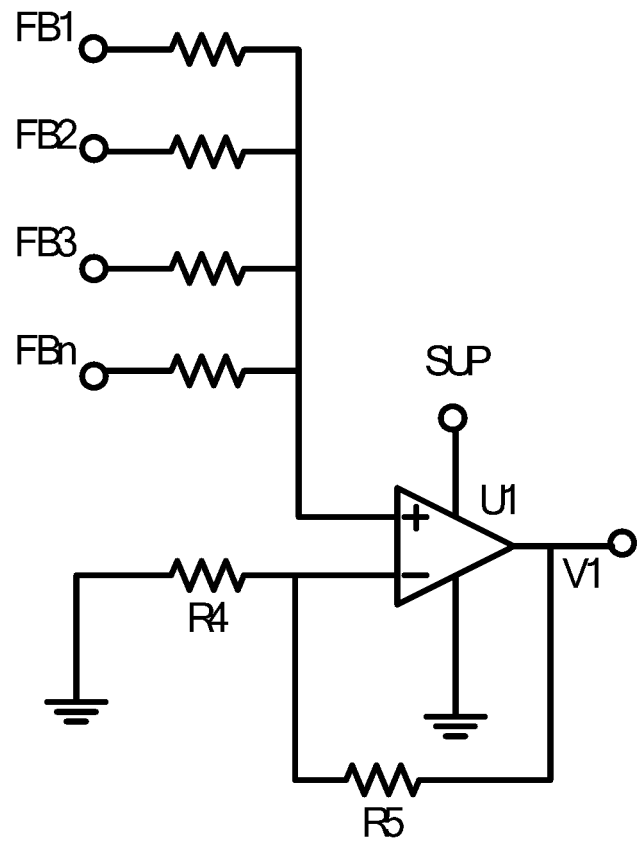
FIG. 7 is a circuit structural diagram of a detection unit provided by an embodiment of the present application.

In the third embodiment, as shown in FIG. 7, the detection unit 101 includes a first operational amplifier U1. The non-inverting input terminal of the first operational amplifier U1 is connected with the plurality of output voltage feedback terminals FB (for example, FB1~FBn), the inverting input terminal of the first operational amplifier U1 is grounded, and the output terminal of the first operational amplifier U1 is connected with the first input terminal of the control unit 102.

In an embodiment, as shown in FIG. 7, a resistor is connected between each output voltage feedback terminal FB and the input terminal of the first operational amplifier U1 to play the role of current limiting protection.

In one embodiment of the application, as shown in FIGS. 7 and 9, the detection unit 101 further includes: a fourth resistor R4 and the fifth resistor R5, the first terminal of the fourth resistor R4 is connected to the inverting input terminal of the first operational amplifier U1, and the second terminal of the fourth resistor R4 is grounded. The first terminal of the fifth resistor R5 is connected to the inverting input terminal of the first operational amplifier U1, and the second terminal of the fifth resistor R5 is connected to the output terminal of the first operational amplifier U1.

In the embodiment, the arrangement of the fourth resistor R4 and the fifth resistor R5 is able to adjust the proportional coefficient of the first operational amplifier U1. In other words, the amplification times of the first operational amplifier U1 is able to achieved by changing the resistance values of the fourth resistor R4 and the fifth resistor R5, so that the first voltage V1 at the output terminal of the first operational amplifier U1 is adjusted. In other embodiments, at least one of the fourth resistor R4 and the fifth resistor R5 is realized by a sliding rheostat.

Figure 8:
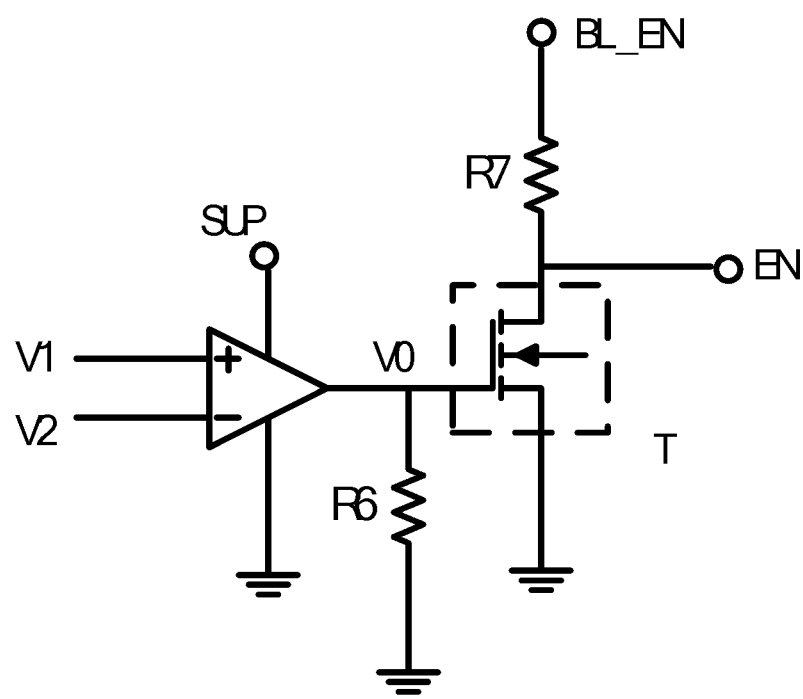
FIG. 8 is a circuit structural diagram of a control unit provided by an embodiment of the present application.

In the fourth embodiment, as shown in FIG. 8, the control unit includes a second operational amplifier U2 and a switching device T.

As shown in FIGS. 8 and 9, the non-inverting input terminal of the second operational amplifier U2 is connected to the output terminal of the detection unit, and the inverting input terminal of the second operational amplifier U2 receives the second voltage V2. The output terminal of the second operational amplifier U2 is connected to the control terminal of the switching device T, the first terminal of the switching device T is connected to the second preset terminal, the second terminal of the switching device T is grounded, the first terminal of the switching device T is connected to the enable terminal EN, and the second preset terminal is configured to provide voltage for the switching device T.

As an example, as shown in FIG. 8, the switching device T is a field-effect transistor, and the second preset terminal is the backlight enable terminal BL_EN. The non-inverting input terminal of the second operational amplifier U2 is connected to the output terminal of the detection unit, the output voltage is the first voltage V1, and the inverting input terminal of the second operational amplifier U2 receives the second voltage value V2. The output terminal of the second operational amplifier U2 is connected with the gate of the field-effect transistor. When the first voltage V1 is greater than the second voltage V2, the voltage V0 at the output terminal of the second operational amplifier U2 is a high level signal to make the field effect transistor conductive.

In the embodiment, when the output terminal of the second operational amplifier U2 is a low level signal, the enable terminal EN is a first level signal. When the output terminal of the second operational amplifier U2 is a high level signal, the switching device is turned on, and the enable terminal EN is a second level signal. The backlight enable terminal BL_EN is grounded through the field-effect transistor. At this time, the enable terminal EN is converted from a high level signal to a low level signal to restart the drive chip.

In one embodiment of the present application, as shown in FIG. 8, the control circuit further includes a sixth resistor R6 and a seventh resistor R7. The first terminal of the sixth resistor R6 is connected to the output terminal of the second operational amplifier U2, and the second terminal of the sixth resistor R6 is grounded. The first terminal of the seventh resistor R7 is connected to the second preset terminal, and the second terminal of the seventh resistor R7 is connected to the first terminal of the switching device T.

In the embodiment, the sixth resistor R6 is a pull-down resistor, which is configured to pull the voltage at the output terminal of the second operational amplifier U2 to the ground. The seventh resistor R7 is used for current limiting protection.

As shown in FIG. 9, for example, in the normal startup state, the external power supply starts to supply power, and the second voltage V2 is output to the inverting input terminal of the second operational amplifier U2 through the voltage division of the first resistor R1 and the second resistor R2. In the normal display state, the second voltage V2 and the voltage Vled at the first preset terminal output the voltage SUP through the regulator LDO. The voltage SUP provides the operating voltage for the first operational amplifier U1 and the second operational amplifier U2, and the first operational amplifier U1 and the second operational amplifier U2 start to work. At this time, the second voltage V2 is greater than the first voltage V1 output by the first operational amplifier U1, the field-effect transistor is turned off, and the enable terminal EN follows the backlight enable terminal BL_EN to be a high level signal. In the abnormal display state, when the output voltage feedback terminal FB1 of the drive chip has over-voltage protection, the FB1 voltage rise increases the first voltage V1 at the output terminal of the first operational amplifier U1. When the second voltage V2 remains unchanged, the first voltage V1 is greater than the second voltage V2, the voltage V0 at the output terminal of the second operational amplifier U2 rises, and the field-effect transistor is turned on to reset the enable terminal EN, that is, the signal of the enable terminal EN is converted from a high level signal to a low level signal, and the drive chip is restarted.

In an embodiment, in the normal startup state, since the output voltage feedback terminal will produce a peak value close to the protection voltage, in order to avoid the impact of the output voltage feedback terminal, the second voltage V2 is delayed first, which can be realized through RC delay circuit, drive chip control and register control. At this time, the first operational amplifier U1 and the second operational amplifier U2 do not work.

The embodiment of the present application provides a drive device, which includes the above control circuit.

Figure 10:
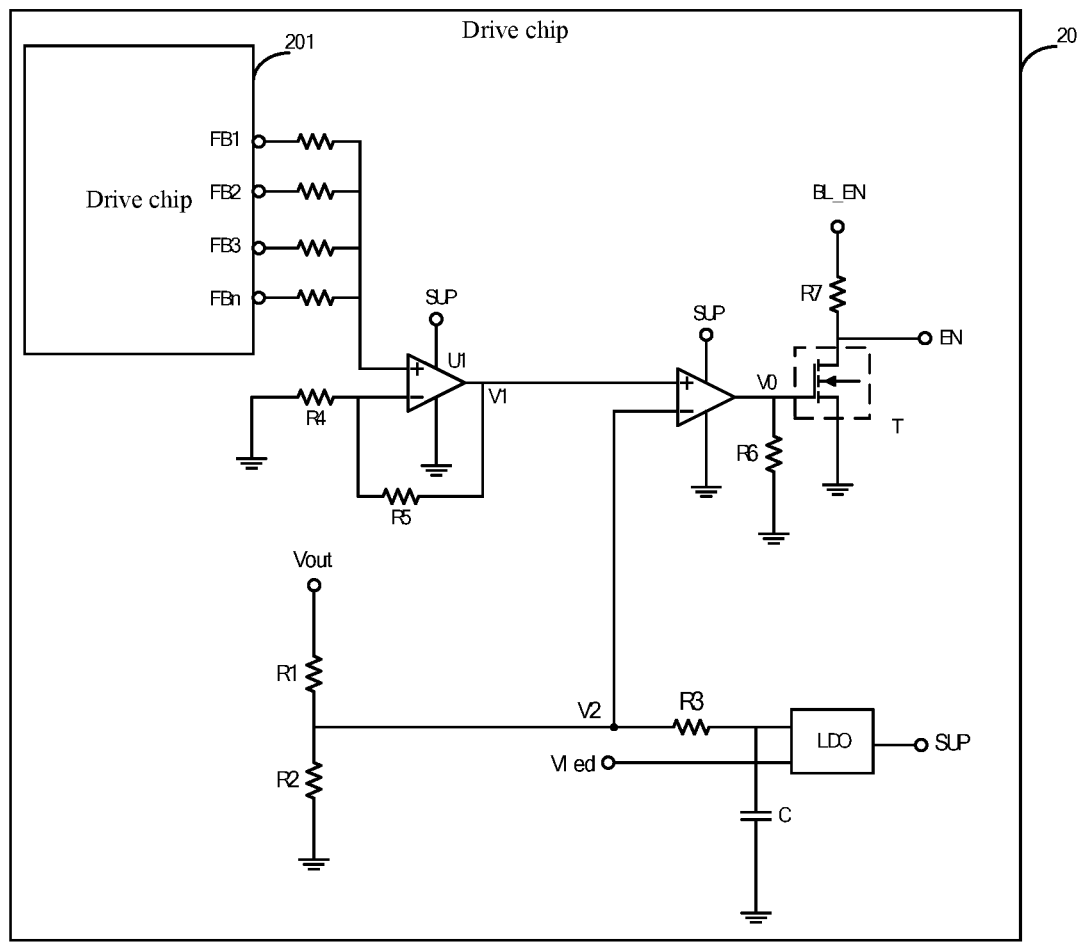
FIG. 10 is a structure diagram of a control device provided by an embodiment of the present application.

As an example, as shown in FIG. 10, the drive device 20 includes a drive chip 201 and a control circuit connected to the drive chip 201. The control circuit is an external circuit of the drive chip, which can realize over-voltage protection detection of the output voltage feedback terminals of the drive chip, and automatically restart the drive chip when over-voltage protection is detected on at least one output voltage feedback terminal.

As another example, the drive device includes a drive chip, which includes the above control circuit.

The embodiment of the present application provides a display, which includes a plurality of backlight strings and a LED drive chip. Each backlight string is connected with one output voltage feedback terminal of the LED drive chip. The LED drive chip is provided with the above control circuit.

In the above embodiments, the description of each embodiment has its own emphasis. For the part not detailed or recorded in one embodiment, referring to the relevant description of other embodiments.

Those skilled in the art can realize that the units and algorithm steps of each example described in combination with the embodiments disclosed herein can be realized by electronic hardware, or the combination of computer software and electronic hardware. Whether these functions are implemented in hardware or software depends on the specific application and design constraints of the technical solution. Professionals and technicians can use different methods for each specific application to realize the described functions, but such implementation should not be considered beyond the scope of the present application.

The above embodiments are only configured to explain the technical solution of the present application, not to limit the present application; although the present application has been described in detail with reference to the preceding embodiments, those skilled in the art should understand that they can still modify the technical solutions recorded in the preceding embodiments, or equivalent replace some of the technical features; However, these modifications or substitutions do not make the essence of the corresponding technical solutions separate from the spirit and scope of the technical solutions of the embodiments of the present application, and should be included in the scope of protection of the present application.

What is claimed is:

1. A control circuit, comprising: control sub-circuit
 a control sub-circuit;
 a detection circuit, connected with a plurality of output voltage feedback terminals of a drive chip, and the detection circuit being connected with the control sub-circuit; and
 a voltage regulating circuit, wherein the voltage regulating circuit comprises: a first resistor and a second resistor; a first terminal of the first resistor being connected to an external power supply, a second terminal of the second resistor being grounded, and a second terminal of the first resistor and the first terminal of the second resistor being connected for providing with the second voltage,
 wherein the detection circuit is configured for providing a first voltage to the control sub-circuit when a voltage of at least one output voltage feedback terminal in the plurality of output voltage feedback terminals is detected, the first voltage being greater than a second voltage received by the control sub-circuit; and
 the control sub-circuit is configured for controlling the drive chip to restart when the first voltage is greater than the second voltage.

2. The control circuit according to claim 1, wherein the detection circuit is further configured for providing a third voltage to the control sub-circuit when no voltage is detected at the plurality of output voltage feedback terminals, and the third voltage being greater than the second voltage received by the control sub-circuit; and
 the control sub-circuit is configured for controlling the drive chip to be in an operating state when the third voltage is less than or equal to the second voltage.

3. The control circuit according to claim 2, wherein the control sub-circuit comprises: a second operational amplifier and a switching device; and
 a non-inverting input terminal of the second operational amplifier is connected with an output terminal of the detection circuit for receiving the first voltage, and an inverting input terminal of the second operational amplifier is configured for receiving the second voltage; and
 an output terminal of the second operational amplifier is connected to a control terminal of the switching device, a first terminal of the switching device is connected to a second preset terminal, a second terminal of the switching device is grounded, the first terminal of the switching device is connected to an enable terminal of the drive chip, and the second preset terminal is configured for providing a voltage for the switching device.

4. The control circuit according to claim 1, wherein the control circuit further comprises: a voltage stabilizing circuit configured for providing operating voltage for the detection circuit and the control sub-circuit, and
 the voltage stabilizing circuit comprises: a voltage stabilizer, a third resistor, and a capacitor; and a first input terminal of the voltage stabilizer is connected to a first terminal of the third resistor, and a second terminal of the third resistor is configured for receiving the second voltage;

a first terminal of the capacitor is connected to the first input terminal of the voltage stabilizer, and a second terminal of the capacitor is grounded; and a second input terminal of the voltage stabilizer is connected to a first preset terminal.

5. The control circuit according to claim 4, wherein the control sub-circuit comprises: a second operational amplifier and a switching device; and a non-inverting input terminal of the second operational amplifier is connected with an output terminal of the detection circuit for receiving the first voltage, and an inverting input terminal of the second operational amplifier is configured for receiving the second voltage; and an output terminal of the second operational amplifier is connected to a control terminal of the switching device, a first terminal of the switching device is connected to a second preset terminal, a second terminal of the switching device is grounded, the first terminal of the switching device is connected to an enable terminal of the drive chip, and the second preset terminal is configured for providing a voltage for the switching device.

6. The control circuit according to claim 1, wherein the detection circuit comprises: a first operational amplifier; and a non-inverting input terminal of the first operational amplifier is connected with the plurality of output voltage feedback terminals, an inverting input terminal of the first operational amplifier is grounded, and an output terminal of the first operational amplifier is connected to a first input terminal of the control sub-circuit.

7. The control circuit according to claim 6, wherein the detection circuit further comprises: a fourth resistor and a fifth resistor; and a first terminal of the fourth resistor is connected to the inverting input terminal of the first operational amplifier, and a second terminal of the fourth resistor is grounded; and a first terminal of the fifth resistor is connected to the inverting input terminal of the first operational amplifier, and a second terminal of the fifth resistor is connected to the output terminal of the first operational amplifier.

8. The control circuit according to claim 7, wherein the control sub-circuit comprises: a second operational amplifier and a switching device; and a non-inverting input terminal of the second operational amplifier is connected with an output terminal of the detection circuit for receiving the first voltage, and an inverting input terminal of the second operational amplifier is configured for receiving the second voltage; and an output terminal of the second operational amplifier is connected to a control terminal of the switching device, a first terminal of the switching device is connected to a second preset terminal, a second terminal of the switching device is grounded, the first terminal of the switching device is connected to an enable terminal of the drive chip, and the second preset terminal is configured for providing a voltage for the switching device.

9. The control circuit according to claim 6, wherein the control sub-circuit comprises: a second operational amplifier and a switching device; and a non-inverting input terminal of the second operational amplifier is connected with an output terminal of the detection circuit for receiving the first voltage, and an inverting input terminal of the second operational amplifier is configured for receiving the second voltage; and an output terminal of the second operational amplifier is connected to a control terminal of the switching device, a first terminal of the switching device is connected to a second preset terminal, a second terminal of the switching device is grounded, the first terminal of the switching device is connected to an enable terminal of the drive chip, and the second preset terminal is configured for providing a voltage for the switching device.

10. The control circuit according to claim 1, wherein the control sub-circuit comprises: a second operational amplifier and a switching device; and a non-inverting input terminal of the second operational amplifier is connected with an output terminal of the detection circuit for receiving the first voltage, and an inverting input terminal of the second operational amplifier is configured for receiving the second voltage; and an output terminal of the second operational amplifier is connected to a control terminal of the switching device, a first terminal of the switching device is connected to a second preset terminal, a second terminal of the switching device is grounded, the first terminal of the switching device is connected to an enable terminal of the drive chip, and the second preset terminal is configured for providing a voltage for the switching device.

11. The control circuit according to claim 10, wherein the control circuit further comprises: a sixth resistor and a seventh resistor; and a first terminal of the sixth resistor is connected to the output terminal of the second operational amplifier, and a second terminal of the sixth resistor is grounded; and a first terminal of the seventh resistor is connected to a third preset terminal, and a second terminal of the seventh resistor is connected to the first terminal of the switching device.

12. The control circuit according to claim 1, wherein the control sub-circuit comprises: a second operational amplifier and a switching device; and a non-inverting input terminal of the second operational amplifier is connected with an output terminal of the detection circuit for receiving the first voltage, and an inverting input terminal of the second operational amplifier is configured for receiving the second voltage; and an output terminal of the second operational amplifier is connected to a control terminal of the switching device, a first terminal of the switching device is connected to a second preset terminal, a second terminal of the switching device is grounded, the first terminal of the switching device is connected to an enable terminal of the drive chip, and the second preset terminal is configured for providing a voltage for the switching device.

13. A drive device, comprising: a control circuit, and the control circuit comprising:

a control sub-circuit;

a detection circuit, connected with a plurality of output voltage feedback terminals of a drive chip, and the detection circuit being connected with the control sub-circuit; and a voltage regulating circuit, wherein the voltage regulating circuit comprises: a first resistor and a second resistor; a first terminal of the first resistor being connected to an external power supply, a second terminal of the second resistor being grounded, and a second terminal of the first resistor and the first terminal of the second resistor being connected for providing with the second voltage, wherein the detection circuit is configured for providing a first voltage to the control sub-circuit when a voltage of at least one output voltage feedback terminal in the plurality of output voltage feedback terminals is detected, the first voltage being greater than a second voltage received by the control sub-circuit; and the control sub-circuit is configured for controlling the drive chip to restart when the first voltage is greater than the second voltage.

14. A display, comprising: a plurality of backlight strings and a LED drive chip, the LED drive chip is provided with a plurality of output voltage feedback terminals, each of the backlight strings is connected with one of the output voltage feedback terminals of the LED drive chip, and the LED drive chip is provided with a control circuit comprising:

a control sub-circuit;

a detection circuit, connected with a plurality of output voltage feedback terminals of a drive chip, and the detection circuit being connected with the control sub-circuit; and a voltage regulating circuit, wherein the voltage regulating circuit comprises: a first resistor and a second resistor; a first terminal of the first resistor being connected to an external power supply, a second terminal of the second resistor being grounded, and a second terminal of the first resistor and the first terminal of the second resistor being connected for providing with the second voltage, wherein the detection circuit is configured for providing a first voltage to the control sub-circuit when a voltage of at least one output voltage feedback terminal in the plurality of output voltage feedback terminals is detected, the first voltage being greater than a second voltage received by the control sub-circuit; and the control sub-circuit is configured for controlling the drive chip to restart when the first voltage is greater than the second voltage.

15. The display according to claim 14, wherein the detection circuit is further configured for providing a third voltage to the control sub-circuit when no voltage is detected at the plurality of output voltage feedback terminals, and the third voltage being greater than the second voltage received by the control sub-circuit; and the control sub-circuit is configured for controlling the drive chip to be in an operating state when the third voltage is less than or equal to the second voltage.

16. The display according to claim 14, wherein the control circuit further comprises: a voltage stabilizing circuit configured for providing operating voltage for the detection circuit and the control sub-circuit, and the voltage stabilizing circuit comprises: a voltage stabilizer, a third resistor, and a capacitor; and a first input terminal of the voltage stabilizer is connected to a first terminal of the third resistor, and a second terminal of the third resistor is configured for receiving the second voltage;

a first terminal of the capacitor is connected to the first input terminal of the voltage stabilizer, and a second terminal of the capacitor is grounded; and a second input terminal of the voltage stabilizer is connected to a first preset terminal.

17. The display according to claim 14, wherein the detection circuit comprises: a first operational amplifier; and a non-inverting input terminal of the first operational amplifier is connected with the plurality of output voltage feedback terminals, an inverting input terminal of the first operational amplifier is grounded, and an output terminal of the first operational amplifier is connected to a first input terminal of the control sub-circuit.

18. The display according to claim 17, wherein the detection circuit further comprises: a fourth resistor and a fifth resistor; and a first terminal of the fourth resistor is connected to the inverting input terminal of the first operational amplifier, and a second terminal of the fourth resistor is grounded; and a first terminal of the fifth resistor is connected to the inverting input terminal of the first operational amplifier, and a second terminal of the fifth resistor is connected to the output terminal of the first operational amplifier.

* * * * *